United States Patent
Klein

(10) Patent No.: US 7,437,052 B2
(45) Date of Patent: Oct. 14, 2008

(54) LINE COMBINATION

(75) Inventor: Ernst Klein, Düsseldorf (DE)

(73) Assignee: ekd gelenkrohr GmbH, Erkrath (DE)

( * ) Notice: Subject to any disclaimer, the term of this patent is extended or adjusted under 35 U.S.C. 154(b) by 0 days.

(21) Appl. No.: 11/402,771

(22) Filed: Apr. 12, 2006

(65) Prior Publication Data

US 2006/0233513 A1      Oct. 19, 2006

(30) Foreign Application Priority Data

Apr. 14, 2005    (EP) .................................. 05008161

(51) Int. Cl.
  *G02B 6/00* (2006.01)
(52) U.S. Cl. ..................................................... 385/147
(58) Field of Classification Search .................. 385/147
  See application file for complete search history.

(56) References Cited

U.S. PATENT DOCUMENTS 3,160,175 A * 12/1964 Laemmle .................... 248/68.1
6,061,880 A    5/2000 Senninger

FOREIGN PATENT DOCUMENTS

DE        295 02 257.4       5/1995
GB           2173052       * 10/1986

* cited by examiner

*Primary Examiner*—Ellen Kim
(74) *Attorney, Agent, or Firm*—Collard & Roe, P.C.

(57) ABSTRACT

A line combination includes at least two parallel flexible lines, which connect a connector fixed in place locally or on a machine with a moveable machine part, and can be displaced axially relative to one another in the combination. The term "lines" covers cables and hoses of all types. Connecting elements are attached or molded onto the lines, which produce the connection between the lines and permit only axial relative movements between adjacent lines.

6 Claims, 4 Drawing Sheets

LINE COMBINATION

CROSS REFERENCE TO RELATED APPLICATIONS

Applicant claims priority under 35 U.S.C. §119 of European Application No. 05 008 161.1 filed on Apr. 14, 2005 wherein the disclosure of which is hereby incorporated herein by reference.

BACKGROUND OF THE INVENTION

1. Field of the Invention

The present invention relates to a line combination made up of at least two parallel flexible lines, which can be displaced axially relative to one another in the combination. Within the scope of the invention, the term "line" covers cables and hoses of all types. In particular, the term includes power-carrying lines, e.g. single-conductor or multi-conductor electrical lines, fluid lines, light guide cables, coaxial cables, and the like.

2. The Prior Art

A woven line combination is known from DE-U 295 02 257, in which lines lying next to one another are integrated.

The known line combination is intended for fixed laying of electrical lines. This combination demonstrates great tolerance for alternate bending and good deformability, which are advantageous for laying, because no continuous material flow exists between the conductors or lines, and adjacent lines can freely move relative to one another in the woven fabric. The line combination is not suitable for lines that connect a connector that is fixed in place locally or on a machine, on a robot arm or a machine, with a movable connector, for example, because it does not have sufficient stability to hold the lines, which are laid parallel to one another, in the desired order. The risk exists that the lines, which are laid parallel, will twist relative to one another in an uncontrolled manner during operation.

Different attachment elements are described in U.S. Pat. No. 3,160,175 and U.S. Pat. No. 6,061,880 for fixing lines in place and holding them at a distance relative to one another. These attachment elements, as well, are exclusively intended for laying lines in a fixed location.

The state of the art provides power supply chains consisting of chain links that can pivot in multiple axes for lines that must be guided on robot arms. Power supply chains that permit multi-axial movements are complicated and expensive in production. Frequently, the desired effect is not achieved with such power supply chains, either, that of guiding the lines in a stable direction in certain regions, on the one hand, and, at the same time, guaranteeing the flexibility required in other regions. Furthermore, with these chains, there is no possibility to include additional lines after the existing chain cross-section has been exhausted.

SUMMARY OF THE INVENTION

It is an object of the present invention to provide a line combination of flexible lines disposed parallel next to one another, which permits arc-shaped movements about all three spatial axes, but reliably prevents twisting or torsion of individual lines of the combination about the longitudinal axis of the combination. The line combination should be able to follow almost any desired movements of a machine part, and always guarantee a parallel orientation of the lines while doing so. The line combination also should be expandable, practically without limits, by means of subsequently adding additional lines.

These and other objects are achieved, according to the invention, by a line combination made up of at least two parallel flexible lines, which connect a connector fixed in place locally or on a machine with a movable machine part, and can be displaced axially relative to one another in the combination. The connecting elements are attached or molded onto the lines, produce the connection between the lines, and permit only axial relative movements between adjacent lines.

The direct line combination according to the invention is similar to a multi-conductor flat cable, but is one in which the individual conductors, i.e. lines, can be displaced relative to one another in the line direction, in each instance. The lines can be displaced exclusively axially relative to one another. By means of the connecting elements provided on the lines, the combination demonstrates great torsion capability, at the same time. There is a large number of possibilities for the design configuration. Thus, design variants are possible in which the connecting elements are formed as part of the line mantle or the hose wall. Furthermore, indirect variants in which the connecting elements are attached subsequently, for example as a shrink hose, sleeve, or hose clamp, are within the scope of the invention. Interval embodiments, in which the lines are provided with connecting elements only in certain segments, as well as embodiments in which the connecting elements extend over the entire line length, are also covered by the invention.

In one possible embodiment according to the invention, the connecting elements are made up of plastic bodies that have two line bushings for one line, in each instance. In this embodiment, one of the line bushings can be connected with the assigned line, in fixed manner, and the other line is disposed in the line bushing assigned to it so that it does not rotate and is axially movable. It is practical if the lines have at least one longitudinal groove or one bead that extends in the longitudinal direction, which acts together with a projection or groove, respectively, in the assigned line bushing, to prevent rotation. Also, clamping rings can be attached to the lines, which have a profile of projections and set-backs on the outside circumference, whereby the profile of the clamping rings works together with a corresponding profile in the assigned line bushings, to prevent rotation.

In another embodiment according to the invention, the connecting elements disposed or attached on adjacent lines engage into one another with a positive lock, and can be displaced relative to one another in the longitudinal direction of the lines. The connecting elements can be made up of plastic bodies that have a line bushing that can be connected with the assigned line in fixed manner, as well as a profile for connecting additional connecting elements on the outsides.

As indicated above, a functional principle according to the invention is that the connecting elements disposed or attached on adjacent lines engage into one another with a positive lock and can be displaced, relative to one another, in the longitudinal direction of the lines. This principle can also be implemented by molding the connecting elements onto the mantle of the lines, in one piece. It is practical if the connecting elements have the shape of a T-shaped groove and/or a corresponding T-shaped projection, or other geometries with a linear guide function. The connecting elements can extend longitudinally over the entire length of the line as an extruded product. Furthermore, there is the possibility to affix the connecting elements, e.g. as plastic injection-molded parts, on the plastic mantle of the lines, at predetermined intervals.

The connecting elements can also be molded onto a flexible protective hose that forms an accommodation space for power-carrying lines. The protective hose is configured, for example, as a corrugated hose, into which a power-carrying line can be drawn.

In another embodiment of the invention, the connecting elements are molded onto a covering hose that adheres in fixed manner to a power-carrying line. The covering hose can be configured as a shrink hose. Alternatively, the covering here can be formed by a film that is laid against the mantle of a power-carrying line with overlapping edge regions and sealed to form a hose shape by means of a seal seam at the overlapping edge regions.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
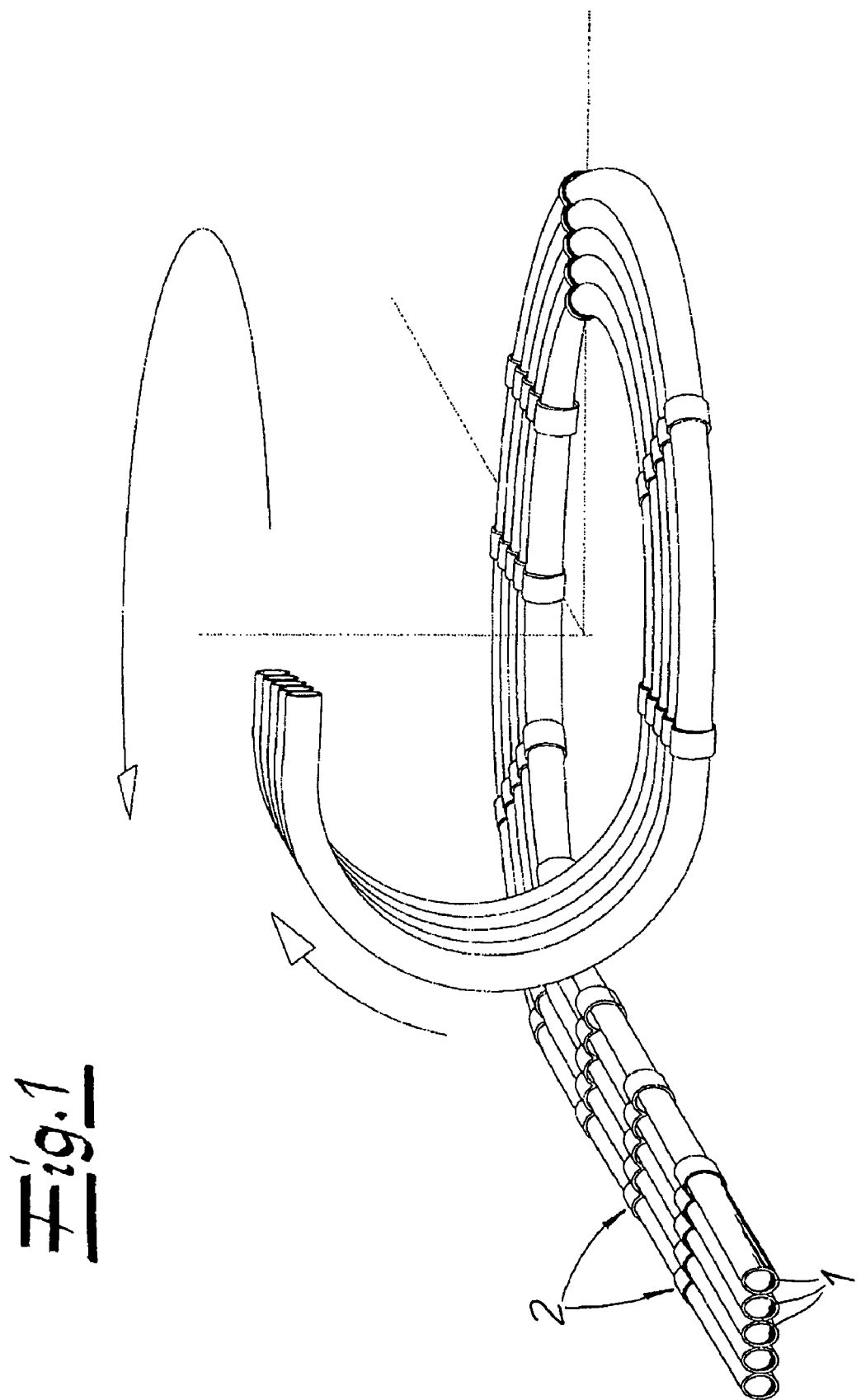
FIG. 1 is a schematic representation of a line combination of several parallel lines in a perspective view.

Turning now in detail to the drawings, the line combination shown in FIG. 1 has several parallel flexible lines 1. The term "lines" is intended to cover cables and hoses of all types. The term particularly includes power-carrying lines, for example single-conductor or multi-conductor electrical lines, fluid lines, light guide cables, coaxial cables, and the like.

Figure 2:
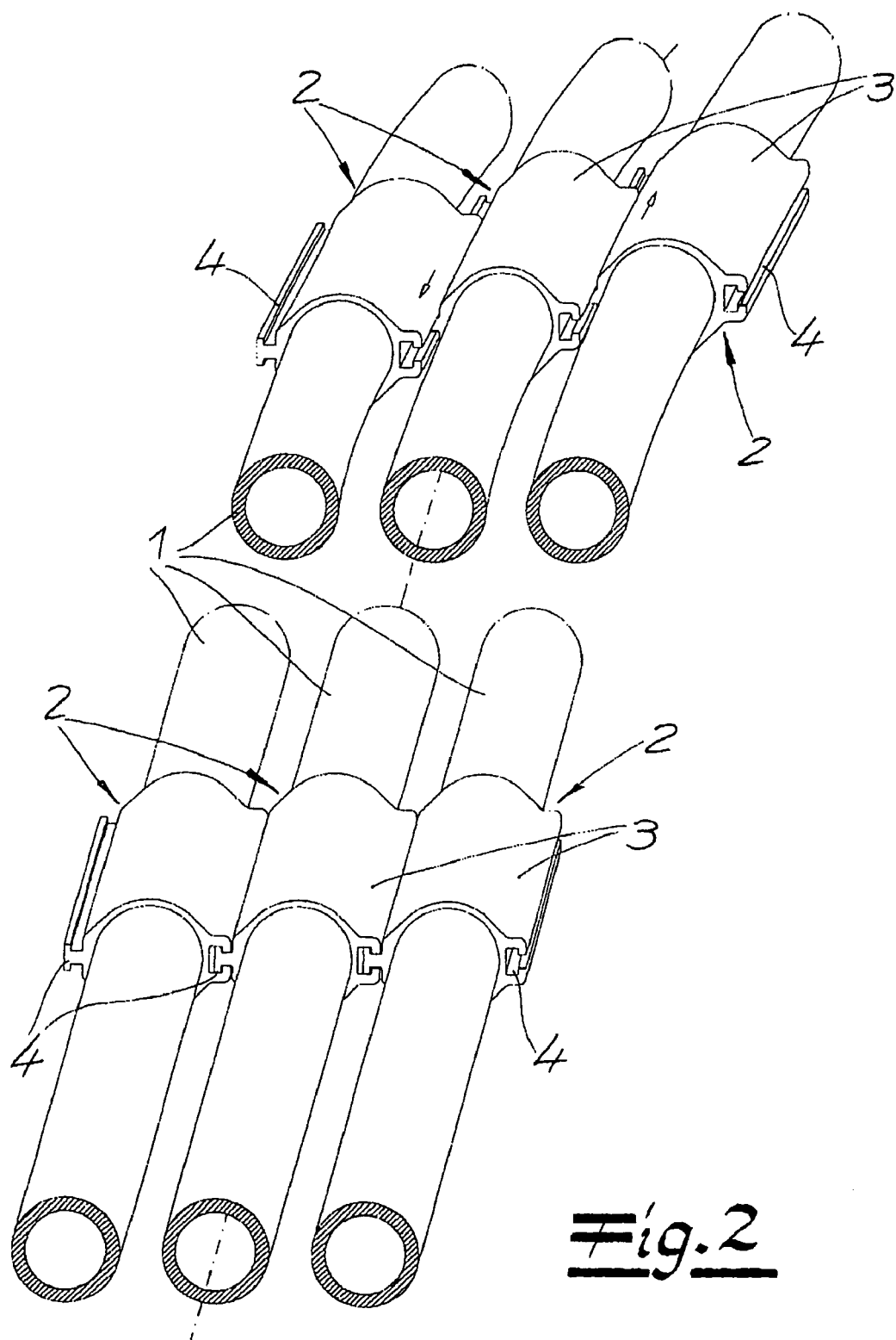
FIG. 2 shows a detail of FIG. 1 in a representation on a larger scale as compared with FIG. 1.

Lines 1 can move axially, relative to one another, in the combination. The line combination can thereby perform almost any movements in three dimensions, while maintaining a predetermined directional stability, and always guarantees orderly, non-twisted guidance of the lines while doing so. The line combination is intended for laying lines that connect a connector fixed in place locally or on a machine with a movable machine part. In particular, the line combination is also suitable for parallel guidance of lines on multi-axial machines and robot arms. Connecting elements 2 are attached or molded onto the lines. Connecting elements 2 produce the connection between lines 1 and permit only axial relative movements between adjacent lines. In the exemplary embodiment of FIG. 2, connecting elements 2 are made up of plastic bodies 3 that have a line bushing firmly connected with the assigned line 1, as well as a profile for connecting additional connecting elements on the outsides. Connector profile 4 is configured in T shape, as a tongue and groove, and allows axial displacement of the lines 1 relative to one another in the case of curvature of the line combination.

Figure 3:
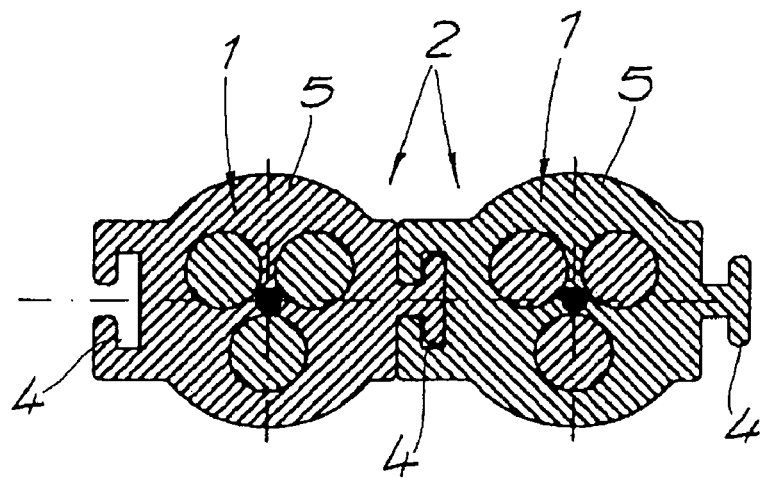
FIGS. 3 to 6 show additional embodiments of the line combination, each in cross-section.
Figure 4:
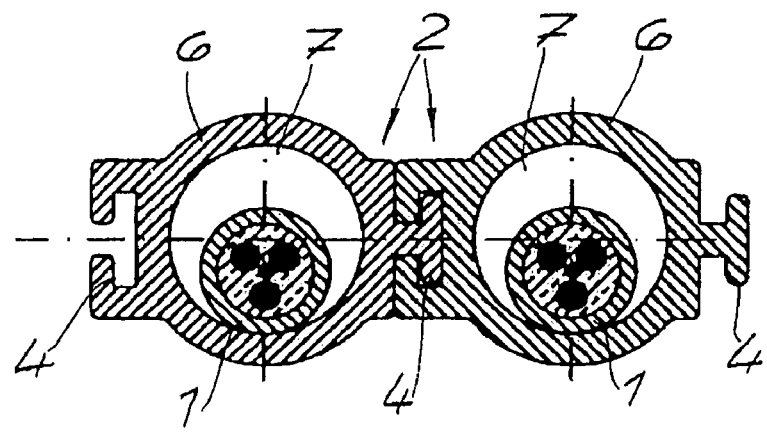
Figure 5:
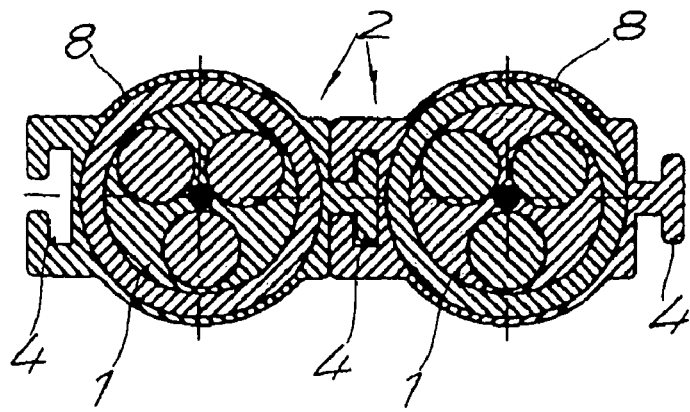

The embodiments shown in FIGS. 3 to 5 also are based on the principle that the connecting elements 2 disposed or attached on adjacent lines engage into one another with a positive lock, and can be displaced relative to one another in the longitudinal direction of lines 1. In FIG. 3, connecting elements 2 are molded in one piece onto the mantle 5 of power-carrying lines. In the exemplary embodiment of FIG. 4, connecting elements 2 are molded onto a flexible protective hose 6 which forms an accommodation space 7 for a power-carrying line 1. For example, protective hose 6 may be a corrugated hose. According to the embodiment in FIG. 5, connecting elements 2 are molded onto a covering hose 8 which firmly adheres to a power-carrying line 1. Covering hose 8 is for example, a shrink hose, or is made up of a film that is laid against the mantle of a power-carrying line with overlapping edge regions and sealed in hose-like manner by means of a seal seam at the overlapping edge regions. Covering hose 8 can also be attached by being glued onto the line. In the case of all the embodiments described, connecting elements 2 have a T-shaped connecting profile 4 in the form of a T-shaped groove and/or a corresponding T-shaped projection, or other geometries having a linear guide function. The tongue/groove geometries permit axial relative movements of lines 1, relative to one another.

Figure 6:
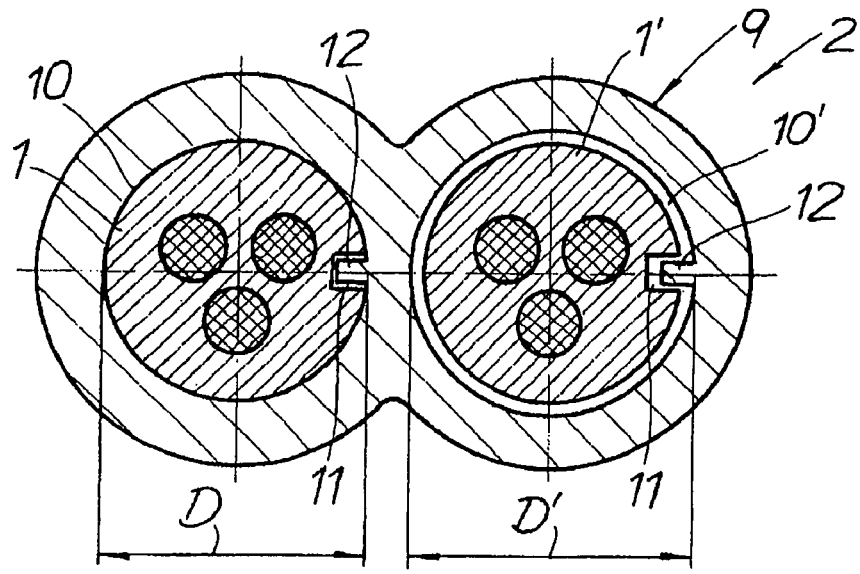

In the embodiment of FIG. 6, the connecting elements 2 are made up of plastic bodies 9 that have two line bushings 10, 10' for one line 1, 1', in each instance. One of the line bushings 10 is connected with the assigned line 1, in fixed manner, while the other line 1' is disposed in the line bushing 10' assigned to it so that it does not rotate and is axially movable. The lines 1, 1', for example an electrical cable or a hose for a fluid, have a longitudinal groove 11 or a bead that extends in the longitudinal direction. The groove or bead acts together with a projection 12 or groove, respectively, in the assigned line bushing, to prevent rotation. In the exemplary embodiment, plastic body 9 is implemented as a dual plug-in sleeve that are configured with different inside diameters D, D' and a projection. The line bushing 10 with the smaller diameter D sits firmly on the assigned line 1, with a clamp fit, whereby the line is additionally secured against rotation by means of the projection 12 that engages into the longitudinal groove 11. In the other line bushing 10, 10', which has a greater diameter D', the line 1' is guided with play. In this connection, the projection 12 that engages into the longitudinal groove 11 of the line 1' secures the line 1' to prevent rotation.

Figure 7:
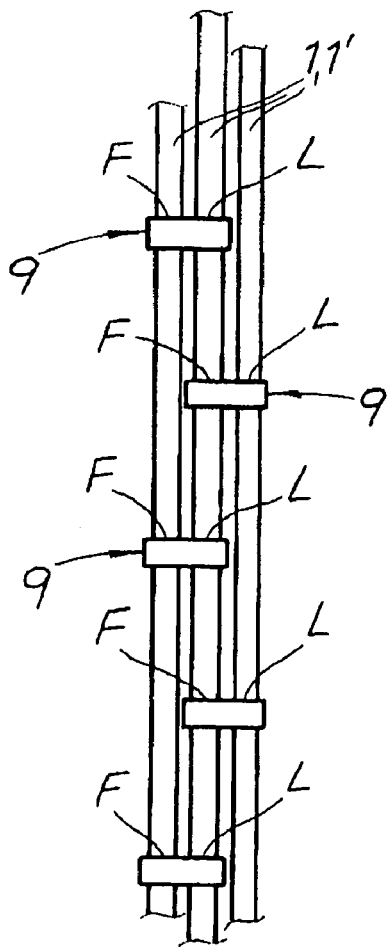
FIG. 7 is a schematic representation of a line combination of several parallel lines, using the elements shown in FIG. 6.

Using the plastic bodies 9 shown in FIG. 6, it is possible to form a line combination of a plurality of lines 1, 1' that lie next to one another. Such an arrangement is shown in FIG. 7. It is evident from the representation how fixed connections F and loose connections L alternate on a line 1, in the longitudinal direction of the line.

Although several embodiments have been shown and described, it is to be understood that many changes and modifications may be made there unto without deporting from the spirit and scope of the invention as defined in the appended claims.

What is claimed is:

1. In a machine with a movable machine part a line combination is provided comprising:

(a) at least two parallel flexible power-carrying lines for connecting a connector fixed in place or fixed on the machine with the movable machine part, each of said at least two parallel flexible lines having a respective length;

(b) at least two flexible hoses, each of said lines being disposed in a respective one of said flexible hoses: and (c) a plurality of T-shaped connecting elements formed onto said at least two flexible hoses, each connecting element comprising a T-groove or a corresponding T-shaped projection extending over the entire length of the line disposed in the flexible hose so that the T-shaped projection and the T-groove of adjacent flexible hoses engage into one another with shape fit and are displaceable relative to one another in a longitudinal direction to permit the hoses to be displaced axially relative to one another in the line combination, wherein the line combination is able to follow almost any desired movements of a movable machine part, and performs a non-twisted guidance of the lines while doing so.

2. The line combination according to claim 1 wherein each flexible hose comprises a corrugated protective hose.

3. In a machine with a movable machine part a line combination is provided comprising:
 (a) at least two parallel flexible power-carrying lines for connecting a connector fixed in place or fixed on the machine with the movable machine part, each of said at least two parallel flexible lines having a respective length;
 (b) at least two covering hoses, each of said lines being surrounded by a respective one of said covering hoses, each covering hose firmly adhering to the respective line; and
 (c) a plurality of T-shaped connecting elements formed onto said at least two covering hoses, each connecting element comprising a T-groove or a corresponding T-shaped projection extending over the entire length of the line surrounded by the covering hose so that the T-shaped projection and the T-groove of adjacent covering hoses engage into one another with shape fit and are displaceable relative to one another in a longitudinal direction to permit the covering hoses to be displaced axially relative to one another in the line combination, wherein the line combination is able to follow almost any desired movements of a movable machine part, and performs a non-twisted guidance of the lines while doing so.

4. The combination according to claim 3, wherein each covering hose is a shrink-fit hose.

5. The combination according to claim 3, wherein each covering hose comprises a film that is laid against an associated power-carrying line with overlapping edge regions and sealed to form the hose by means of a sealing seam at the overlapping edge regions.

6. In a machine with a movable machine part a line combination is provided comprising:
 (a) at least two parallel flexible power-carrying lines for connecting a connector fixed in place or fixed on the machine with the movable machine part, each of said at least two parallel flexible lines having a respective mantle and a respective length, and
 (b) a plurality of T-shaped connecting elements formed onto the mantles of the lines, each connecting element comprising a T-groove or a corresponding T-shaped projection extending over the entire length of the line so that the T-shaped projection and the T-groove of adjacent lines engage into one another with shape fit and are displaceable relative to one another in a longitudinal direction to permit the lines to be displaced axially relative to one another in the line combination, wherein the line combination is able to follow almost any desired movements of a movable machine part, and performs a non-twisted guidance of the lines while doing so.

* * * * *